United States Patent Office 3,316,238
Patented Apr. 25, 1967

3,316,238
AZO DYESTUFFS AND THEIR METAL
COMPLEX COMPOUNDS
Hans-Gerhard Hanke, Leverkusen, Gerhard Wolfrum, Opladen, Rolf Pütter, Duesseldorf, and Karl-Heinz Menzel, Leverkusen, Germany, assignors to Farbenfabriken Bayer Aktiengesellschaft, Leverkusen, Germany, a corporation of Germany
No Drawing. Filed May 14, 1963, Ser. No. 280,434
Claims priority, application Germany, June 5, 1962,
F 36,988
9 Claims. (Cl. 260—146)

The present invention concerns azo dyestuffs of the general formula

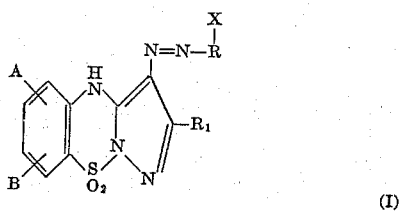

(I)

as well as their metal complex compounds.

In the general formula R denotes the radical of a diazo component wherein X is present in the o-position relative to the azo bridge. A and B are hydrogen or substituents usual in azo dyestuffs which may be identical or differ from each other, for instance Cl, Br, nitro, acetylamino, methoxy, ethoxy, sulfonic acid, sulfonamide or sulfone groups; $R_1$ is a lower alkyl, phenyl, —$CH_2COOH$ or a carboxylic acid lower alkyl ester group; and X represents a group capable of forming a complex, or an atom exchangeable for such a group, or a grouping which can be converted to a group of this type.

The novel metal-free dyestuffs of Formula I can be prepared by coupling suitable diazonium salts with pyrazolo [1,5-b][1,2,4]benzothiadiazine-dioxides[1,1] of the formula

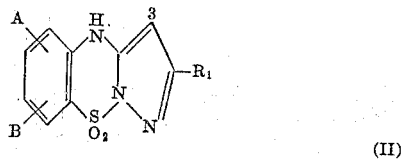

(II)

at the 3-position of the pyrazole ring, wherein A, B and $R_1$ have the above-specified significance.

Amines suitable for the preparation of the diazonium compounds are, for instance, 1-amino-2-hydroxybenzene, 1 - amino - 2 - hydroxy - 4 - nitrobenzene, 1 - amino-2-hydroxy - 4 - chlorobenzene, 3 - amino - 4 - hydroxybenzene-sulphonic acid-(1), 3 - amino - 4 - hydroxy - 5 - chlorobenzene-sulphonic acid-(1), 3 - amino - 4 - hydroxybenzene-sulphonamide-(1) and 4 - amino - 3 - hydroxybenzene-sulphonamide-(1) and their derivatives substituted on the sulphonamide nitrogen atom by one or two organic radicals, ethyl - (3-amino - 4 - hydroxyphenyl)-sulphone, amino-hydroquinone-methylene-sulphone ether, anthranilic acid, sulphoanthranilic acids, anthranilic acid-sulphonamides as well as their derivatives substituted on the amid nitrogen atom by organic radicals, also sulphanilic acid, 3-amino-4-methoxybenzene-sulphonamide-(1), 1-amino-2-chloro-5-nitrobenzene, 2-chloro-4-nitraniline, 1-amino-2-methoxy - 4 - nitrobenzene, 2-cyano-4-nitraniline, and 2,6-dichloro-4-nitraniline.

Suitable pyrazolo[1,5-b][1,2,4] benzothiadiazine - dioxides[1,1] are, for example, 2-methyl-pyrazolo [1,5-b] [1,2,4]benzothiadiazine-dioxide[1,1]; 2,5,7 - trimethyl-pyrazolo[1,5-b][1,2,4]benzothiadiazine - dioxide[1,1]; 2,7-dimethyl - 6 - chloropyrazolo[1,5-b][1,2,4]benzothiadiazine-dioxide[1,1]; 2 - phenyl-pyrazolo[1,5-b][1,2,4]benzothiadiazine-dioxide[1,1]; 2 - methyl - 7 - nitro-pyrazolo [1,5-b][1,2,4]benzothiadiazine - dioxide[1,1]; and 2 - methyl-pyrazolo[1,5-b][1,2,4]benzothiadiazine - dioxide [1,1]sulphonic acid-(7). The last of the listed coupling components is obtained by the sulphonation of 2-methyl-pyrazolo[1,5-b][1,2,4]benzothiadiazine-dioxide[1,1]. The above compounds may, for example, be prepared by cyclization of o-aminobenzenesulphopyrazolones of the general formula

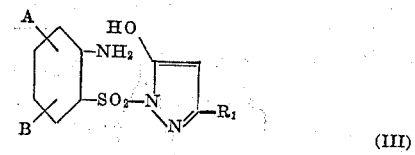

(III)

wherein $R_1$, A and B have the above-indicated meaning in an acid medium to form pyrazolo[1,5-b][1,2,4]benzothiadiazine dioxides[1,1] of the general Formula II.

In order to carry out the process for preparing the coupling compounds II the o-aminobenzenesulphopyrazolones are heated in water or organic solvents, such as methanol, ethanol, glycol monoethyl ether or formamide, dimethyl formamide or mixtures thereof, in the presence of organic or inorganic acids, such as aromatic sulphonic acids, hydrochloric or sulphuric acid. The reaction temperature lies generally between about 30° C. and the boiling temperature of the reaction medium. The closed-ring compounds are subsequently separated by evaporating the solvent or by adding water.

According to a modification of the process it is also possible to transform o-aminobenzenesulphonic acid hydrazides directly into the pyrazolobenzothiadiazine dioxides (II), for example with acetoacetic acid amide in an acid medium.

The metal complex compounds of these dyestuffs are obtained by treating the azo dyestuffs of Formula I, in bulk or on a substrate, with metal discharging agents by a method known per se. For this purpose, dyestuffs of the given formula, wherein X denotes a group capable of forming complexes or a grouping which can be converted to a group of this type, can be reacted with copper, chromium, cobalt, or nickel salts. If this reaction is carried out with copper salts in the presence of oxidising agents, it is also possible to employ those dyestuffs of the given formula wherein X denotes hydrogen; in that case, the hydrogen atom is exchanged for a hydroxyl group and this is simultaneously converted to the copper complex. By way of metallising compounds, it is also possible to employ those complex-forming compounds which already contain a chromium atom linked by a complex bond to a dyestuff molecule and which are capable of forming a complex bond with another dyestuff molecule in order to form 2:1 complexes. This method produces mixed metal complex dyestuffs. Metallising is preferably carried out with the use of chromium discharging agents.

The dyestuffs obtainable according to the process may have good, low, or no solubility in water, depending on the type of their substituents. The metal-free dyestuffs and those which are little soluble or insoluble are suitable for dyeing and printing synthetic materials such as polyesters and cellulose triacetate. The metal complex compounds insoluble in water can be employed as pigments. The metal complex compounds soluble in water are particularly suitable for dyeing animal fibres; in addition, they can be fixed on cellulose fibres by chemical bonds in known manner if corresponding reactive groups are present.

The following examples are given for the purpose of illustrating the invention. The "parts" specified therein are parts by weight.

*Example 1*

18.8 parts of 1-amino-2-hydroxybenzene-4-sulphonic acid amide are dissolved in 75 parts of water and 30 parts of hydrochloric acid (*d* 1.19) and diazotised at 0° C. with the addition of ice. This diazotised mixture is then added at 0–5° C. to a solution of 27.4 parts of 2,5,7-trimethylpyrazo[1.5 - b][1,2,4]benzothiadiazine - dioxide [1,1] in 1000 parts of water and 25 parts of sodium hydroxide. When coupling has been completed, the resultant azo dyestuff of the formula

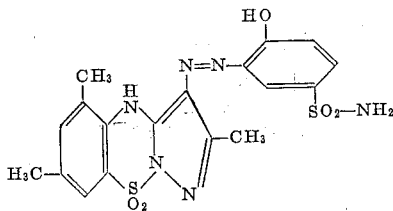

is separated by the addition of sodium chloride and then filtered off with suction.

In order to prepare the chromium complex, the dyestuff is dissolved in 300 parts of water and 24 parts of sodium hydroxide solution (*d* 1.46) with heating, and after the addition of 70 parts of a solution of sodium chromoxalate which has a chromium content of 2.3% the solution is boiled under reflux for 3 hours. The chromium complex dyestuff which has thus been formed is separated by the addition of sodium chloride, then filtered off with suction and dried. It consists of a dark powder, which dissolves in water with a violet colour and dyes wool from a weakly acidic bath to red-violet shades of good fastness properties, particularly with very good fastness to light.

*Example 2*

18.8 parts of 1-amino-2-hydroxybenzene-4-sulphonic acid amide are diazotised as described in Example 1. The diazonium salt solution is then added at 0–5° C. to a solution of 24 parts of 2-methyl-pyrazolo[1,5-b][1,2,4]benzothiadiazinedioxide[1,1] in 400 parts of water and 25 parts of sodium hydroxide solution (*d* 1.46). When coupling has been completed, the resultant azo dyestuff of the formula

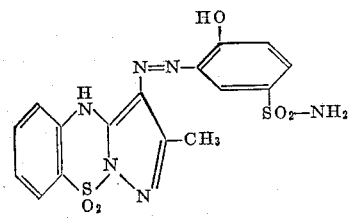

is separated by the addition of sodium chloride and then filtered off with suction. For chroming, the dyestuff is dissolved in 300 parts of ethylene glycol. 17 parts of anhydrous sodium acetate are added, it is heated to 120° C., and then 13 parts of $CrCl_3 \cdot 6H_2O$ are gradually added. When chroming has been completed, the solution is added to 600 parts of water, the chromium complex is precipitated by the addition of sodium chloride and filtered off with suction. It consists of a dark powder, and dyes wool from an acidic bath to red-violet shades with good fastness properties.

The same complex is formed when the dyestuff solution obtained by coupling is heated to 100° C. and treated during 30 minutes with a solution of 7.5 parts of potassium dichromate and 13.8 parts of glucose in 50 parts of water, whilst stirring thoroughly. After cooling, the 2:1 chromium complex is precipitated with sodium chloride.

For the preparation of the cobalt complex dyestuff, the solution of the monoazo dyestuff obtained by coupling is heated to 80° C. and treated with 115 parts of the cobalt-containing solution which is described below. When dried, the cobalt complex dyestuff consists of a dark brown powder, which dyes wool from an acidic bath to corinth-brown shades with good fastness properties.

The employed cobalt-containing solution was prepared by the following method: 500 parts of a 25% aqueous ammonium hydroxide solution were added to a solution of 281 parts of crystalline cobalt sulphate in 1000 parts of water with vigorous stirring; then air was blown in for a sufficiently long time for a sample no longer to produce a precipitate when 10% sodium hydroxide solution is added. The mixture was subsequently made up to 2000 parts with water.

By analogy with the description in Examples 1 and 2, the corresponding monoazo dyestuffs are prepared from the diazo amide including substituted lower alkyl and hydroxy lower alkylamides, the alkyl moieties thereof having a combined total of up to 2 carbon atoms, and coupling components listed in the following table, where their chromium complex compounds dye wool to the stated dye shades.

| Diazo component | Coupling component | Dye shade of dyeing on wool |
|---|---|---|
| 1-amino-2-hydroxy-benzene-5-sulpho-dimethylamide. | | Reddish violet. |
| 1-amino-2-hydroxy-benzene-4-sulpho-dimethylamide. | | Corinth. |
| 1-aminobenzene-2-carboxylic acid. | | Orange. |

*Example 3*

22.3 parts of 1-amino-2-hydroxy-3-chlorobenzene-5-sulphonic acid are diazotised in the usual manner, and the diazotisation mixture is then added to a solution of 34 parts of 2 - methyl - pyrazolo[1,5-b][1,2,4]benzothiadiazine-dioxide[1,1]sulphonic acid-(7) in 300 parts of water dye shapes, with good fastness properties, after they have subsequently been chromed.

| Diazo component | Coupling component | Dye shade of dyeing on wool after subsequent chroming |
|---|---|---|
| 4-chloro-2-aminophenol-6-sulphonic acid | 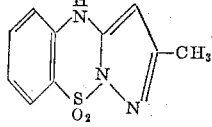 | Bluish violet. |
| 2-aminophenol-4-sulphonic acid | 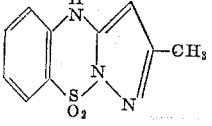 | Bluish Bordeaux. |
| 2-aminobenzoic acid-5-sulphonic acid | 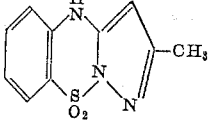 | Yellowish orange. |
| 2-aminophenol-4-sulphonic acid | 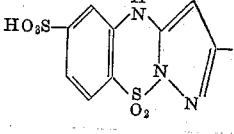 | Bluish red. |
| 5-nitro-2-aminophenol | 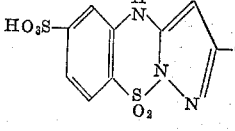 | Bluish violet. | and 60 parts of sodium hydroxide solution (d 1.46) whilst the temperature is maintained below 5° C. by the addition of ice. When coupling has been completed, the resultant dyestuff of the formula

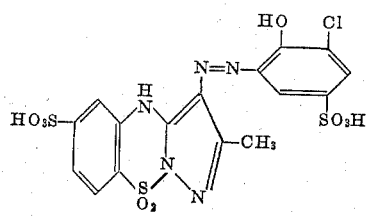

is separated by the addition of sodium chloride and then filtered off with suction.

Wool is dyed with this dyestuff at 100° C. during 1 hour from an aqueous acidic bath to orange-red shades. Potassium dichromate solution is subsequently added to the dye bath and heating is continued for about 45 minutes. The dye shade of the dyeing on wool changes to bluish Bordeaux during this operation. The dyeing thus obtained exhibits good fastness properties.

By the same method, monoazo dyestuffs are obtained from the diazo and coupling components listed in the following table, whose dyeings on wool produce the stated

*Example 4*

18 parts of 2-cholo-4-nitraniline are triturated with 25 parts of hydrochloric acid (d 1.19), treated with ice, and diazotised with a solution of 7 parts of sodium nitrite in 20 parts of water. The solution is then added at 0–5° C. to a solution of 24 parts of 2-methyl-pyrazolo[1,5-b] [1,2,4]benzothiadiazine-dioxide[1,1] in 600 parts of water and 25 parts of sodium hydroxide solution (d 1.46). The dyestuff of the following constitution

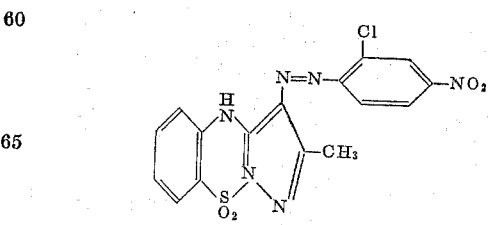

is precipitated by the addition of sodium chloride, filtered off with suction, and dried. It consists of a powder with an orange colour, which dyes polyester materials and cellulose triacetate orange shades.

By the same method valuable dyestuffs are obtained from the diazo and coupling components listed in the following table:

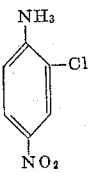

Example 5

The coupling component used in Example 1 was prepared in accordance with the following prescription:

21 parts by volume of freshly distilled diketene are slowly added dropwise to a mixture of 50 parts of phenol and 0.5 part by volume of a sodium hydroxide solution maintaining the temperature at 40–45° C. by immersing the reaction vessel into cold water. The mixture is finally cooled to 25° C., treated with 200 parts by volume of water and 2.5 parts by volume of acetic acid, and 53 parts of 3,5-dimethyl-2-aminobenzene sulphonic acid hydrazide are then introduced. An oily reaction mixture is formed which is stirred for 4 hours at 20° C. and one hour at 45° C. After cooling, the water is decanted off, the oily layer dissolved in methanol and the o-aminobenzene-sulphopyrazolone is precipitated in crystalline form by the careful addition of water. 67 parts of melting point 153–154° C. are obtained.

70 parts of this compound are heated to the boil for 30 minutes in 210 parts by volume of methanol and 210 parts by volume of semi-concentrated hydrochloric acid. After cooling, the reaction mixture is introduced into 1000 parts by volume of water, the precipitated crystals are filtered off with suction and re-crystallised from ethanol. 49 parts of 2,5,7-trimethyl-pyrazolo[1,5-b][1,2,4]-benzothiadiazine dioxide [1,1] of melting point 265–267° C. are obtained. Results of analysis were as follows.

$C_{12}H_{13}N_3O_2S$ (mol. wt. 263.15): Calculated, C, 54.75; H, 4.98; N, 15.96; O, 12.15; S, 12.15. Found, C, 55.07; H, 4.99; N, 16.02; O, 12.31; S, 12.20.

Example 6

The coupling component used in Example 2 was prepared in accordance with the following method:

108.5 parts of 2-nitrobenzene-sulphonic acid hydrazide are stirred with 700 parts by volume of methanol and treated with 65 parts by volume of acetoacetic acid ethyl ester. After a clear solution has been formed, 53 parts of anhydrous sodium carbonate are added and the mixture is then stirred at room temperature for another 12 hours in order to complete the ring closure. The sodium carbonate is then filtered off with suction, washed with methanol, the filtrate is made up to 1800 parts by volume with methanol and then hydrogenated at 30–40° C. after the addition of Raney nickel at a hydrogen pressure of 20 atmospheres. After completion of the hydrogenation, the catalyst is filtered off with suction, the solvent concentrated in a vacuum, and the precipitated o-aminobenzene-sulphopyrazolone (101 parts) is filtered off with suction.

To 64 parts of this compound, dissolved in 300 parts by volume of water, 50 parts by volume of concentrated hydrochloric acid are slowly added and the fine suspension is heated to 70° C. for 30 minutes. After cooling, the product is filtered off with suction and re-crystallised from ethanol. 48 parts of 2-methyl-pyrazolo[1,5-b]-[1,2,4]benzothiadiazine dioxide[1,1] are obtained of melting point 282–283° C., with the following analytical results.

$C_{10}H_9N_3O_2S$ (molecular weight 235.20): Calculated, C, 51.06; H, 3.86; N,17.87; O, 13.60; S, 13.60. Found, C, 50.96; H, 3.90; N, 17.73; O, 13.74; S, 13.60.

Example 7

18.9 parts of 1-amino-2-hydroxybenzene-5-sulfonic acid are dissolved in 75 parts of water and 30 parts of hydrochloric acid ($d$=1.19) and diazotised with the addition of ice at 0° C. The diazotisation mixture is then added at 0 to 5° C. to a solution of 28 parts of 2-carboxymethyl-pyrazolo[1,5-b] [1,2,4]benzothiadiazine - dioxide[1,1] in 200 parts of water and 25 parts of sodium hydroxide. When the coupling is complete the resultant dyestuff of the formula

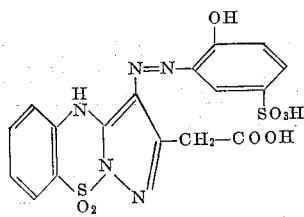

is separated by the addition of hydrochloric acid and then filtered off with suction.

The dyestuff can be converted into the chromium complex either on a substrate or when treated as described in Examples 1 and 2.

When following the above method but using the components listed in the following table other valuable dyestuffs can be obtained:

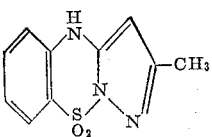

| Diazo component | Coupling component | Shade of the chromium complex on wool |
|---|---|---|
| 1-amino-2-hydroxybenzene-sulfonic acid-(5)-monomethylamide. | | Reddish violet. |

| Diazo component | Coupling component | Shade of the chromium complex on wool |
|---|---|---|
| 1-amino-2-hydroxybenzene-sulfonic acid-(5)-hydroxyethylamide. | (structure with $CH_3$) | Redish violet. |
| 1-amino-2-hydroxybenzene-sulfonic acid-(5)-morpholid. | (structure with $CH_3$) | Do. |
| 1-amino-2-hydroxybenzene-sulfonic acid-(5) | (structure with $CH_2-COOC_2H_5$) | Bordeaux. |
| Do | (structure with $CONH_2$) | Do. |
| Do | (structure with $H_2NO_2S-$ and $CH_3$) | Bluish red. |
| Do | (structure with $O_2N-$ and $CH_3$) | Brown. |
| Do | (structure with $HN-COCH_3$ and $CH_3$) | Red. |
| Do | (structure with $H_3CO-$ and $CH_3$) | Do. |
| 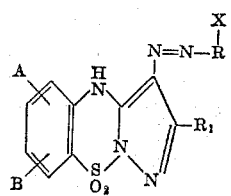 | (structure with $HO_3S-$ and $CH_3$) | Red-brown. |

We claim:
1. An azo dyestuff of the formula wherein A and B stand for radicals selected from the class consisting of hydrogen, Cl, Br, nitro, acetylamino, methoxy ethoxy, sulfonic acid, sulfonamide and sulfone groups, $R_1$ represents a member taken from the class consisting of lower alkyl, phenyl, —$CH_2COOH$ and a carbo lower alkoxy group, R is a member selected from the class consisting of sulfophenyl, chloro substituted sulfophenyl, nitro substituted cyanophenyl, sulfonamide substituted phenyl, lower alkyl substituted sulfonamido substituted phenyl and hydroxy lower alkyl substituted sulfonamido substituted phenyl, the alkyl moieties thereof having a total up to 2 carbon atoms, sulfomorpholido substituted phenyl, phenyl, nitrophenyl and nitro chloro substituted phenyl; and X is a member selected from the class consisting of chloro, COOH, OH and $OCH_3$, R carrying the azo bridge and X in o-position to one another; and the metal complex compound of said azo dyestuff selected from the class consisting of the copper, chromium, cobalt and nickel complex compound.

2. A dyestuff of claim 1 wherein

stands for a diazo component from an o-amino-hydroxyphenyl sulfonic acid.

3. A dyestuff of claim 1 wherein

stands for a diazo component from a chloro substituted o-amino-hydroxyphenyl sulfonic acid.

4. The dyestuff of the formula

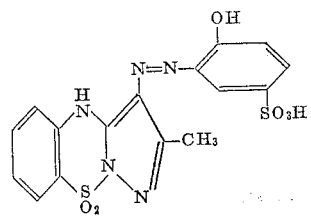

5. The dyestuff of the formula

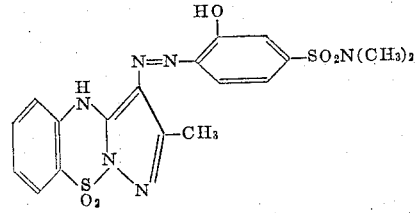

6. The chromium complex of the dyestuff of claim 4.
7. The chromium complex of the dyestuff of claim 5.
8. The cobalt complex of the dyestuff of claim 4.
9. The cobalt complex of the dyestuff of claim 5.

References Cited by the Examiner

Derwent Belgium Patents Report, vol. 73A, page A11, Feb. 3, 1961.

CHARLES B. PARKER, *Primary Examiner.*

IRVING MARCUS, *Examiner.*

REYNOLD FINNEGAN, DONALD M. PAPUGA,
*Assistant Examiners.*